US008327176B2

United States Patent
Accapadi et al.

(10) Patent No.: US 8,327,176 B2
(45) Date of Patent: Dec. 4, 2012

(54) OPTIMIZING POWER MANAGEMENT IN MULTICORE VIRTUAL MACHINE PLATFORMS BY DYNAMICALLY VARIABLE DELAY BEFORE SWITCHING PROCESSOR CORES INTO A LOW POWER STATE

(75) Inventors: Mathew Accapadi, Austin, TX (US); Grover Cleveland Davidson, II, Round Rock, TX (US); Dirk Michel, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/751,227

(22) Filed: Mar. 31, 2010

(65) Prior Publication Data
US 2011/0246800 A1    Oct. 6, 2011

(51) Int. Cl.
*G06F 1/32* (2006.01)
(52) U.S. Cl. .................. 713/323; 713/300; 713/320
(58) Field of Classification Search .................. None
See application file for complete search history.

(56) References Cited

U.S. PATENT DOCUMENTS

| 5,721,937 | A | 2/1998 | Kurihara et al. |
| 6,357,013 | B1 | 3/2002 | Kelly et al. |
| 7,080,267 | B2 | 7/2006 | Gary et al. |
| 2006/0136919 | A1* | 6/2006 | Aingaran et al. ............. 718/100 |
| 2006/0212733 | A1 | 9/2006 | Hamilton |
| 2009/0007108 | A1* | 1/2009 | Hanebutte ........................ 718/1 |
| 2009/0083002 | A1* | 3/2009 | DeWitt et al. ................ 702/186 |
| 2009/0235270 | A1* | 9/2009 | Anand et al. .................. 718/104 |
| 2009/0254771 | A1 | 10/2009 | So et al. |

* cited by examiner

*Primary Examiner* — Dennis M Butler
(74) *Attorney, Agent, or Firm* — J. B. Kraft; David A. Mims

(57) ABSTRACT

Distributing a thread for running on a physical processor and enabling the physical processor to be switched into a low power snooze state when said running thread is IDLE. However, this switching into said low power state is enabled to be delayed by a delay time from an IDLE dispatch from said running thread; such delay is determined by tracking the rate of the number of said IDLE dispatches per processor clock interval and dynamically varying said delay time wherein the delay time is decreased when said rate of IDLE dispatches increases and the delay time is increased when said rate of IDLE dispatches decreases.

20 Claims, 5 Drawing Sheets

OPTIMIZING POWER MANAGEMENT IN MULTICORE VIRTUAL MACHINE PLATFORMS BY DYNAMICALLY VARIABLE DELAY BEFORE SWITCHING PROCESSOR CORES INTO A LOW POWER STATE

TECHNICAL FIELD

The present invention relates to virtual processor platforms, including a plurality of virtual machines implemented on the core processors in multicore platforms. Each processor respectively connected to one of a plurality of client devices providing application threads to be executed on the processor cores. The invention is directed more particularly to power management for such virtual machine multicore platforms through management of the low power or "snooze" state of the processor cores.

BACKGROUND OF RELATED ART

Over the past generation, virtualization of computer processors has become commonplace. This virtualization involves time slicing of the virtual processors or machines between physical processors. In such virtual processor environments wherein multiple user computers, i.e. client devices are connected to each virtual processor platform providing a plurality of physical processors respectively connected to these, power management is important. This is particularly the case with the current technology of multicore processors on a single integrated circuit chip, e.g. dual core chips. These multicore processors, when operating effectively, do reduce power consumption and, consequently, wasted heat. However, such multicore processors require tighter power management to obtain maximum overall processor power per watt. It is, consequently, important to constrain power at all levels. Accordingly, when a logical or virtual processor application thread being run on a physical processor goes into an idle state in current virtual processing systems, the physical processor core running an application program thread is immediately ceded to the controlling hypervisor. The hypervisor may either cede the core (processor) to a thread from an application running on another logical processor or put the core into a low power state.

The speed with which cores (physical processors) are put into a low power state or ceded to other application threads in current virtualization systems present some problems. When an application thread running on a core to which the thread has dispatched an IDLE, shortly thereafter dispatches instructions, the core will have to be awakened from the low power or snooze state. There will be an attendant latency in awakening the core into the active power state so that the core is ready to run the next instructions from the thread. This latency inhibits optimum effectiveness in power management and in the distribution of application threads between cores.

This problem has been recognized and the processor virtualization technology has applied some solutions. These include: disabling any ceding to the hypervisor, ceding after a fixed time period or ceding immediately. However, all of these current solutions involve making an initial determination as to which fixed approach would be most appropriate for a given workload requirement and applying such a fixed approach until the workload requirements change.

SUMMARY OF THE PRESENT INVENTION

The present invention addresses the problem of latency in awakening cores from the low power snooze state and provides an implementation for power management that enables the dynamic variation of the delay time of a switch into the low power state to ensure optimum core operational effectiveness in switching into and out of the low power snooze state.

To this end, the present invention provides a system, method and computer program for power management in a virtual machine (processor core) environment in which a plurality of threads from a plurality of computer applications running concurrently on a plurality of virtual logical processors share physical processors. The invention's implementation includes distributing a thread for running on a physical processor and enabling the physical processor to be switched into a low power snooze state when said running thread is IDLE. However, this switching into said low power state is enabled to be delayed by a delay time from an IDLE dispatch from said running thread. This delay is determined by tracking the rate of the number of said IDLE dispatches per processor clock interval and dynamically varying said delay time wherein the delay time is decreased when said rate of IDLE dispatches increases; the delay time is increased when said rate of IDLE dispatches decreases.

The implementation of this invention is applicable to operations wherein said distributed thread is one of a plurality of the threads distributed among a plurality of physical processors and wherein the plurality of said threads are distributed through a hypervisor among a plurality of multicore physical processors.

The rate of IDLE dispatches per clock interval may be determined by comparing the number of said IDLE dispatches per processor clock interval of the clock interval last preceding a current clock interval with said number of IDLE dispatches per clock interval of the second to last clock interval preceding a current clock interval.

The present invention may be effectively used for operations in which the threads are implemented in a data structure wherein the rate of the IDLE dispatches per processor clock interval of the clock interval last preceding a current clock interval is defined in a first field and said rate of IDLE dispatches in said second to last preceding clock interval is defined in a second field.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
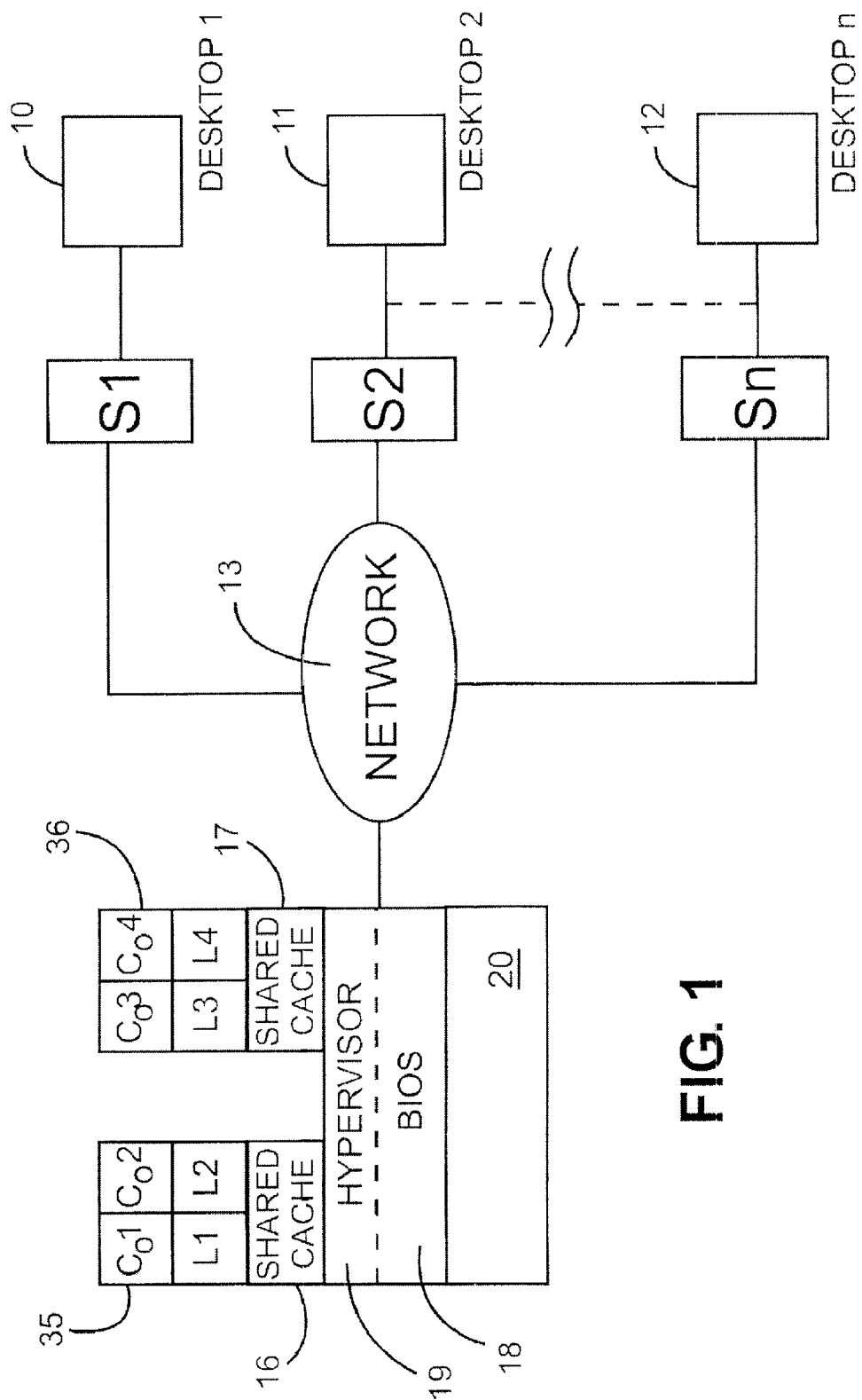
FIG. 1 is a generalized diagrammatic view of a network portion, including a pair of dual core processors and a plurality of remote user computers or client devices connected to physical cores in the platform that may be used in the practice of the present invention.

Referring to FIG. 1, there is shown a generalized diagrammatic view of a network portion, including a pair of dual core processors and a plurality of remote user computers or client devices connected to physical cores in the platform which may be used in the practice of the present invention. Platform 20 supports a pair of dual core processors 35 and 36 that each respectfully include two cores Co1-Co2, and Co3-Co4; each core having a respective cache L1-L4 and each dual respectively sharing a cache 16-17. The client devices providing the application threads to be run on the cores Co1-Co4 may be Desktop computers 10-12, respectively connected to platform 20 through respective network servers S1-Sn via a network 13, such as the Internet. All distribution of the application threads to cores Co1-Co4 are controlled by hypervisor 19. In this function, hypervisor 19 controls the ceding of threads by cores, as well as the powering of cores into and out of the low power or snooze states. The hypervisor 19 handles the IDLE dispatches form running application threads and, as will be hereinafter described in greater detail, implements the present invention's dynamically variable delays for the implementation of the low power in a core in response to an IDLE dispatch. The implementation of this invention is through a computer program run in hypervisor 19 that may be stored in the BIOS 18 of Hypervisor 19.

Figure 2:
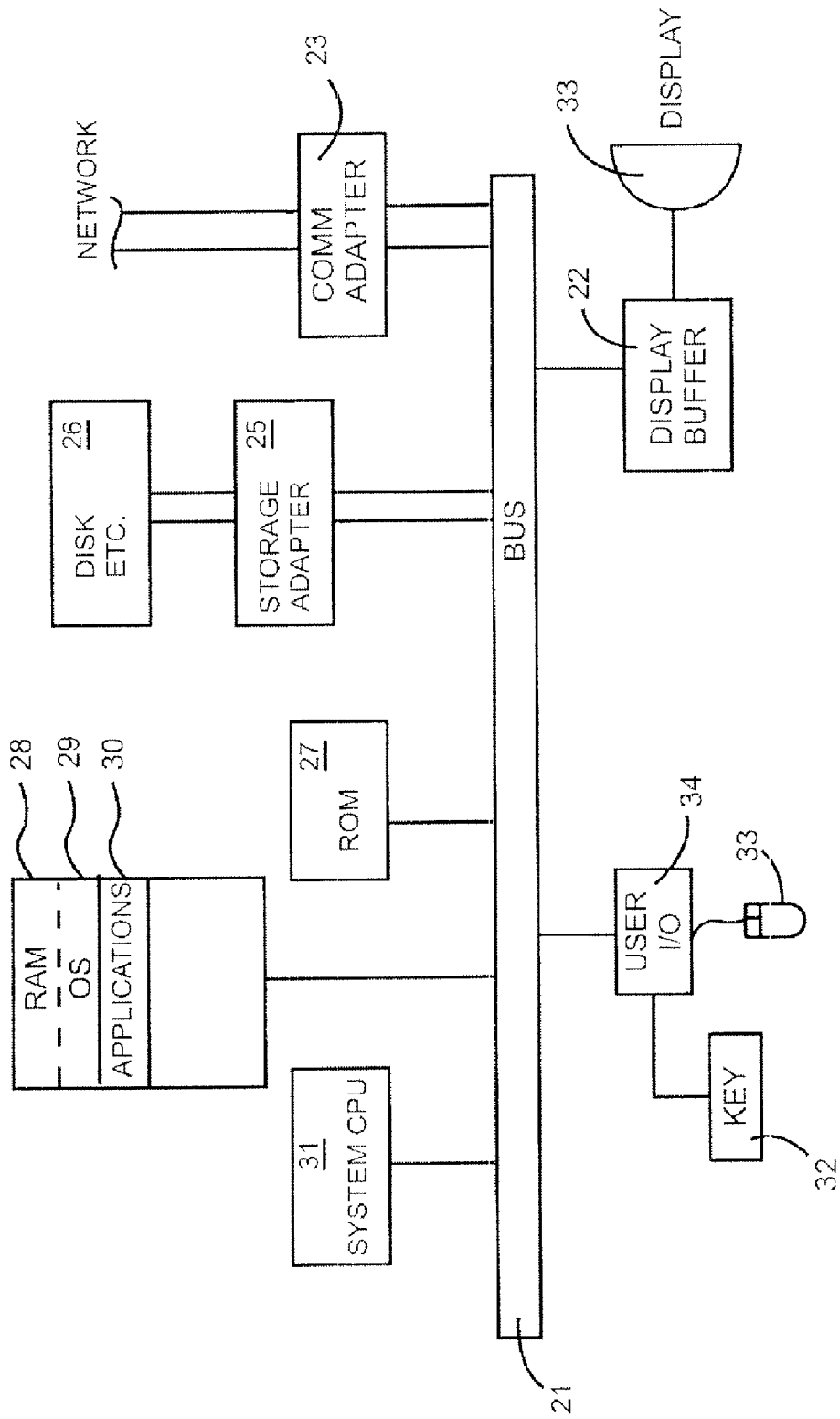
FIG. 2 is an illustrative diagrammatic view of a control processor that may be used for the platform hypervisor of FIG. 1, as well as for the servers for the Desktop devices shown in FIG. 1.

With respect to FIG. 2, there is shown an illustrative diagrammatic view of a control processor that may be used for the platform hypervisor of FIG. 2. A CPU 31, such as one of the microprocessors or workstations, e.g. System p series, available from International Business Machines Corporation (IBM), is provided and interconnected to various other components by system bus 21. An operating system (OS) 29 runs on CPU 31, provides control and is used to coordinate the function of the various components of FIG. 2. Operating system 29 may be one of the commercially available operating systems. Application programs 30, controlled by the system, are moved into and out of the main memory Random Access Memory (RAM) 28. These programming applications may be used to implement functions of the present invention. However, it is preferable that the programs used to implement the present invention be in the BIOS of the controlling hypervisor stored in a Read Only Memory (ROM) 27 connected to CPU 31 via bus 21. ROM 27 includes the Basic Input/Output System (BIOS) that controls the basic computer functions of the hypervisor. RAM 28, storage adapter 25 and communications adapter 23 are also interconnected to system bus 21. Storage adapter 25 communicates with the disk storage device 26. Communications adapter 23 interconnects bus 21 with an outside Web or like network. I/O devices are also connected to system bus 21 via user interface adapter 34. Keyboard 32 and mouse 33 may be connected to bus 21 through user interface adapter 34. Display buffer 22 supports display 33.

Figure 3:
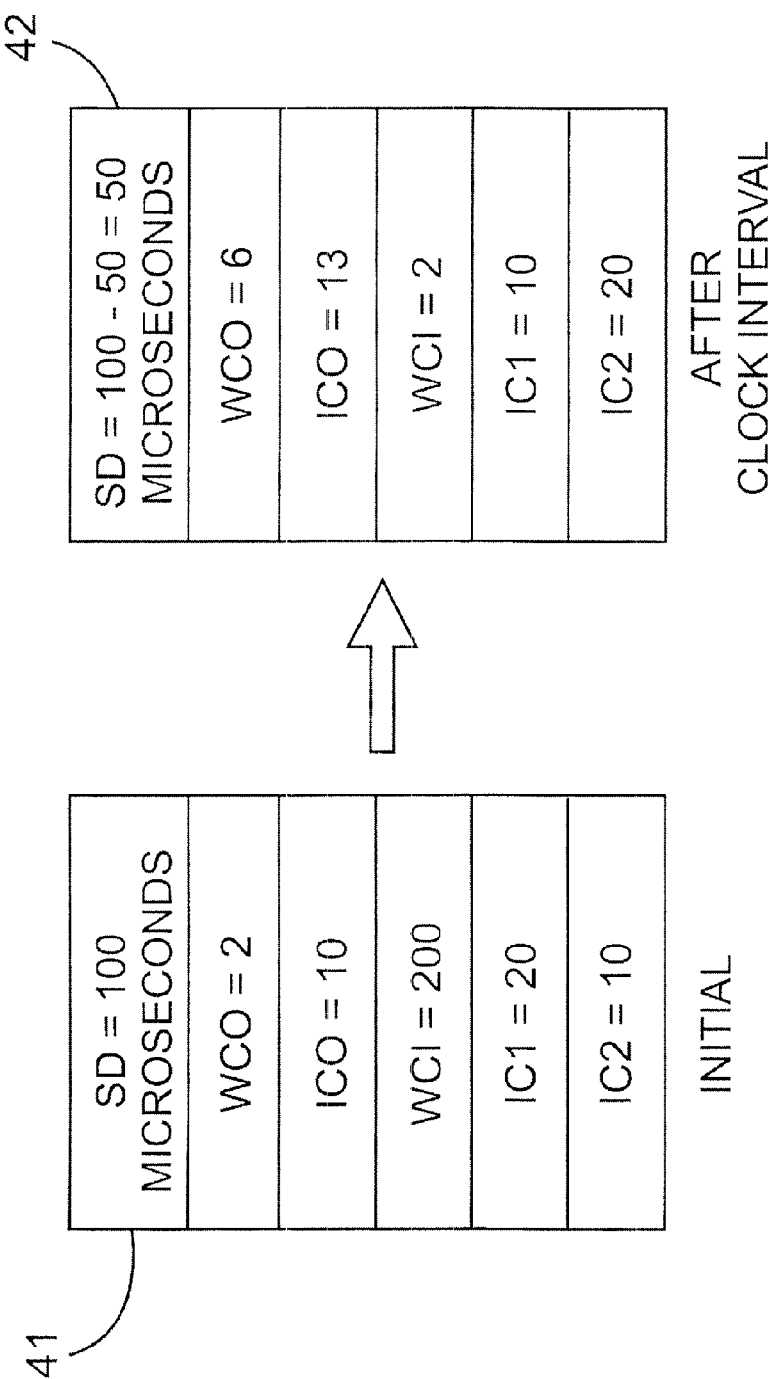
FIG. 3 is a diagram of per CPU data structures for Linux operating systems after successive clock or time intervals simplified to show the comparison of the first and second fields respectively showing the IDLE dispatches during the clock intervals of the last and second to last clock intervals.

Referring to FIG. 3, there will now be described with respect to per CPU data structures for Linux operating systems and after successive clock or time intervals comparison of the first and second fields in such data structures, respectively, showing the IDLE dispatches during the clock intervals of the last and second to last clock intervals.

As used and claimed herein, a clock interval is an operating system defined period of time that is the time between one clock tick and another. The tick value may be defined by the operating system, e.g. a conventional 10 milliseconds. CPU cycles are another way to measure such intervals or periods of time. The number of CPU cycles is determined by the speed or frequency of the particular processor. For example, 1 GHz is the equivalent of 1 billion CPU cycles per seconds. Time intervals may also be measured by time based units or ticks; wherein the number of these units or ticks is based upon the type of processor used. Thus, in the following illustrative example and in this Specification, when the term clock interval is used, it is meant to include any of the above time intervals.

The Initial data structure shown in FIG. 3 is structure, according to the present invention, for a per CPU Linux environment. The Initial data structure has the following defined fields:

WC0: Number of CPU wakeups in current clock interval;
IC0: Number of IDLE dispatches in current clock Interval;
WC1: Number of CPU wakeups in previous clock interval;
IC1: Number of IDLE dispatches in previous clock interval;
IC2: N umber of IDLE dispatches in two clock intervals ago (previous to previous clock interval);
SD: Current snooze delay value.

Using this data structure, at each CPU wakeup the counter in field WC0 is incremented. At each IDLE dispatch, the counter in field IC0 is incremented. At each clock interval, the value IC1 is copied to IC2, the value IC0 is copied to IC1 and the value WC0 is copied to WC1.

Then, the following instructions are followed:
1) If CPU goes IDLE, then
2) The kernel decides to snooze that CPU (i.e. the kernel can cede immediately or after a certain snooze delay time);
3) Compare # of IDLE dispatches in the previous clock interval (IC1) to the # of IDLE dispatches two clock intervals ago (IC2);
4) If IC1<IC2, then this indicates that CPU is IDLE less, so that snooze may come later (snooze may delayed more). Use the number of wakeups in the last clock interval (WC1) and divide the number of time units in one clock interval by this number of wakeups (WC1). Add this value to the current snooze delay value (SD) and delay the snooze by this new snooze delay value; but
5) If IC1>IC2, then this indicates that CPU is IDLE more, so that snooze may come sooner. Thus, the snooze delay value (SD) may be reduced by the number of time units in a clock interval by the # of CPU wakeups in the last clock interval (WC1). If the value (SD) is less than 0, then let the snooze delay (SD)=0.

An illustrative example is shown in FIG. 3 in which the first diagram shows a per CPU data structure 41 at an initial stage at a current clock interval wherein the clock interval is assumed to be 10 milliseconds and the units used for the snooze delay SD calculations (in this example) will be based on 1 microsecond units rather than time based ticks of CPU cycles. The initial structure is subject to 10,000 microseconds per clock interval.

Thus, after the clock interval, 10,000/200(WC1)=50, the resulting data structure 42 is shown in FIG. 3.

Figure 4:
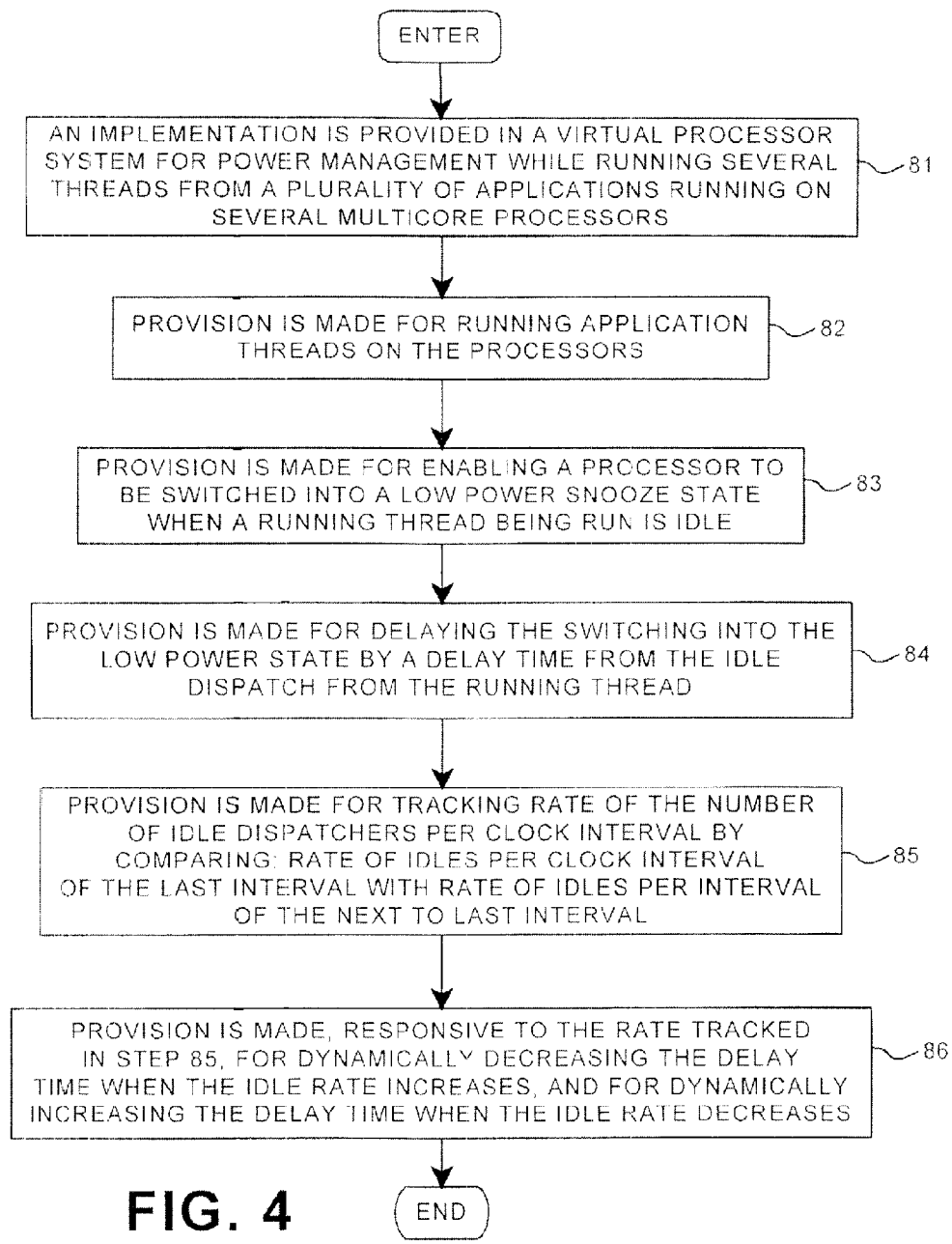
FIG. 4 is a general flowchart of a program set up to implement the present invention for power management in a virtual processor by dynamically varying delay times from an IDLE dispatch until the switch to the low power snooze state.

FIG. 4 is a general flowchart of a program set up to implement the present invention for power management in a virtual processor system by dynamically varying delay times from an IDLE dispatch until the switch to the low power snooze state. In a virtual processor system, a power management implementation is provided in the running of several application threads from several application on multicore processors, step 81.

Provision is made for the distribution and running of the application threads on the cores, step 82.

Provision is made for enabling a core/processor to be switched into a low power snooze state when a running thread becomes IDLE, step 83.

Provision is made for delaying the switching of the core into the IDLE state by a time delay from the IDLE dispatch from the running thread, step 84.

Provision is made for tracking the rate of the number or IDLE dispatches per clock interval by comparing:
Rate of IDLES per clock interval of the last interval;
with
Race of IDLES per interval of the next to last interval, step 85; and Provision is made, step 86, responsive to the tracking in step 85, for dynamically decreasing the delay time when the IDLE rate increases and dynamically increasing the delay time when the IDLE rate decreases.

Figure 5:
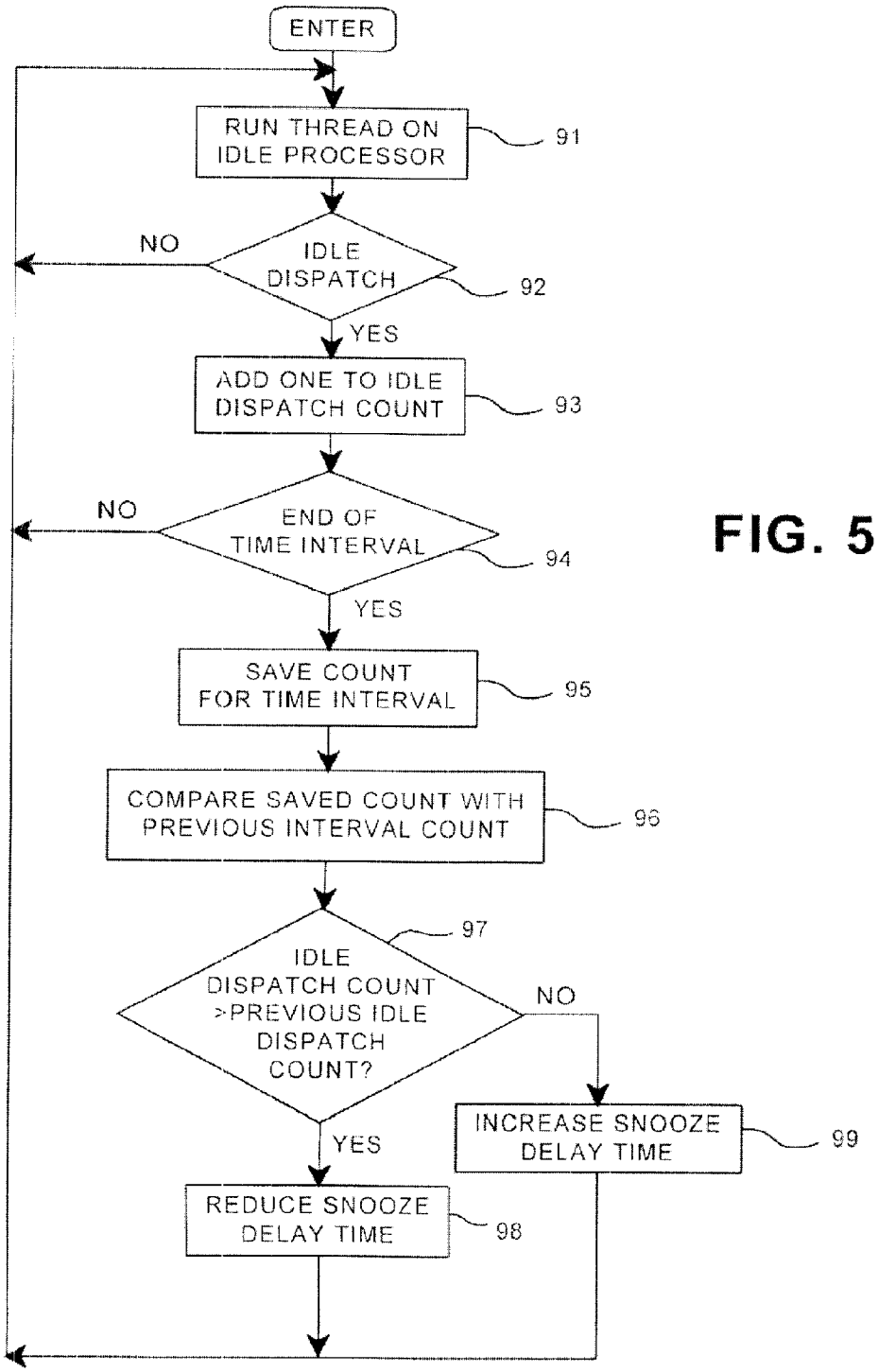
FIG. 5 is a flowchart of an illustrative run of the program set up in FIG. 4 for varying delay times from idle dispatch until low power switch.

A simple illustrative example of a run of the process set up in FIG. 4 is described with respect to the flowchart of FIG. 5. A hypervisor assigns an application thread to be run on an awakened core, step 91. A determination is made as to an IDLE dispatch from the running thread, step 92. If Yes, one is added to the IDLE count, step 93, and a further determination is made as to whether a time or clock interval has ended, step 94. If Yes, the count for the time or clock interval is saved, step 95, and then compared with the count for the previous interval, step 96. A determination is then made, step 97, as to whether the IDLE dispatch count for the current interval is greater than the IDLE dispatch count for the previous interval, step 97. If Yes, the snooze delay time is reduced, step 98. If No, the snooze delay time is increased, step 99. After steps 98 and 99 or after No decisions in steps 92 and 92, the program flow is returned to starting step 91.

Although certain preferred embodiments have been shown and described, it will be understood that many changes and modifications may be made therein without departing from the scope and intent of the appended claims.

What is claimed is:

1. A method for power management in a virtual processor system wherein a plurality of threads from a plurality of computer applications running concurrently on a plurality of virtual logical processors share physical processors comprising:
   distributing a thread for running on a physical processor;
   enabling said physical processor to be switched into a low power snooze state when said running thread is IDLE;
   enabling said switching into said low power state to be delayed by a delay time from an IDLE dispatch from said running thread;
   tracking the rate of the number of said IDLE dispatches per processor clock interval; and
   dynamically varying said delay time wherein said delay time is decreased when said rate of IDLE dispatches increases and said delay time is increased when said rate of IDLE dispatches decreases.

2. The method of claim 1 wherein said distributed thread is one of a plurality of said threads distributed among a plurality of physical processors.

3. The method of claim 2 wherein said plurality of said threads are distributed through a hypervisor among a plurality of multicore physical processors.

4. The method of claim 3 wherein said increase/decrease in said rate of IDLE dispatches per clock interval is determined by comparing the number of said IDLE dispatches per processor clock interval of the clock interval last preceding a current clock interval with said the number of IDLE dispatches per clock interval of the second to last preceding a current clock interval.

5. The method of claim 4 wherein said threads are implemented in a data structure wherein said number of said IDLE dispatches per processor clock interval of the clock interval last preceding a current clock interval is defined in a first field and said rate of IDLE dispatches in said second to last preceding clock interval is defined in a second field.

6. The method of claim 4, wherein said multicore physical processors are implemented on a unitary integrated circuit substrate.

7. The method of claim 2 further including enabling said physical processor running said thread to be switched to another thread when said running thread is IDLE.

8. A computer controlled system for power management in a virtual processor system wherein a plurality of threads from a plurality of computer applications running concurrently on a plurality of virtual logical processors share physical processors, said system for power management comprising:
   a processor; and
   a computer memory holding computer program instructions that when executed by the processor perform the method comprising:
   distributing a thread for running on a physical processor;
   enabling said physical processor to be switched into a low power snooze state when said running thread is IDLE;
   enabling said switching into said low power state to be delayed by a delay time from an IDLE dispatch from said running thread;
   tracking the rate of the number of said IDLE dispatches per processor clock interval; and
   dynamically varying said delay time wherein said delay time is decreased when said rate of IDLE dispatches increases and said delay time is increased when said rate of IDLE dispatches decreases.

9. The system of claim 8 wherein said distributed thread is one of a plurality of said threads distributed among a plurality of physical processors.

10. The system of claim 9 wherein said plurality of said threads are distributed through a hypervisor among a plurality of multicore physical processors.

11. The system of claim 10 wherein said increase/decrease in said rate of IDLE dispatches per clock interval is determined by comparing the number of said IDLE dispatches per processor clock interval of the clock interval last preceding a current clock interval with said the number of IDLE dispatches per clock interval of the second to last preceding a current clock interval.

12. The system of claim 11 wherein said threads are implemented in a data structure where said number of said IDLE dispatches per processor clock interval of the clock interval last preceding a current clock interval is defined in a first field and said rate of IDLE dispatches in said second to last preceding clock interval is defined in a second field.

13. The system of claim 9 wherein the performed method further includes enabling said physical processor running said thread to be switched to another thread when said running thread is IDLE.

14. A computer usable storage medium having stored thereon a computer readable program for power management in a virtual processor system wherein a plurality of threads from a plurality of computer applications running concurrently on a plurality of virtual logical processors share physical processors, wherein the computer readable program when executed on a computer causes the computer to:
   distribute a thread for running on a physical processor;

enable said physical processor to be switched into a low power snooze state when said running thread is IDLE;

enable said switching into said low power state to be delayed by a delay time from an IDLE dispatch from said running thread;

track the rate of the number of said IDLE dispatches per processor clock interval; and dynamically vary said delay time wherein said delay time is decreased when said rate of IDLE dispatches increases and said delay time is increased when said rate of IDLE dispatches decreases.

15. The computer usable medium of claim 14 wherein said distributed thread is one of a plurality of said threads distributed among a plurality of physical processors.

16. The computer usable medium of claim 15 wherein said threads are distributed through a hypervisor among a plurality of multicore physical processors.

17. The computer usable medium of claim 16 wherein said increase/decrease in said rate of IDLE dispatches per clock interval is determined by comparing the number of said IDLE dispatches per processor clock interval of the clock interval last preceding a current clock interval with said the number of IDLE dispatches per clock interval of the second to last preceding a current clock interval.

18. The computer usable medium of claim 17 wherein said threads are implemented in a data structure wherein said number of said IDLE dispatches per processor clock interval of the clock interval last preceding a current clock interval is defined in a first field and said rate of IDLE dispatches in said second to last preceding clock interval is defined in a second field.

19. The computer usable medium of claim 18 wherein said multicore physical processors are implemented on a unitary integrated circuit substrate.

20. The computer usable medium of claim 15 wherein the computer program, when executed, further causes the computer to enable said physical processor running said thread to be switched to another thread when said running thread is IDLE.

* * * * *